(12) United States Patent
Hayasaka et al.

(10) Patent No.: US 8,200,395 B2
(45) Date of Patent: Jun. 12, 2012

(54) VEHICLE COLLISION DECISION APPARATUS

(75) Inventors: Masatoshi Hayasaka, Haga-gun (JP); Fang Yuan, Utsunomiya (JP); Fumitoshi Kase, Mooka (JP); Toshiyuki Kuze, Utsunomiya (JP); Yoshihisa Sugamata, Utsunomiya (JP); Teruaki Aizawa, Utsunomiya (JP); Kazuhiro Daido, Utsunomiya (JP); Hiroyuki Ito, Tochigi-ken (JP)

(73) Assignees: Keihin Corporation, Tokyo (JP); Honda Motor Company, Ltd, Tokyo (JP)

(*) Notice: Subject to any disclaimer, the term of this patent is extended or adjusted under 35 U.S.C. 154(b) by 740 days.

(21) Appl. No.: 12/252,923

(22) Filed: Oct. 16, 2008

(65) Prior Publication Data
US 2009/0099749 A1    Apr. 16, 2009

(30) Foreign Application Priority Data

Oct. 16, 2007 (JP) ................. 2007-269068

(51) Int. Cl.
*B60R 21/0132* (2006.01)
(52) U.S. Cl. ........................ 701/46; 280/735

(58) Field of Classification Search .............. 701/45, 701/46, 47; 280/735
See application file for complete search history.

(56) References Cited

U.S. PATENT DOCUMENTS

| | | | |
|---|---|---|---|
| 5,544,915 A | 8/1996 | Fendt et al. |
| 6,167,335 A | 12/2000 | Ide et al. |
| 6,256,563 B1 | 7/2001 | Blank et al. |
| 6,487,482 B1 | 11/2002 | Mattes et al. |
| 6,530,597 B1 | 3/2003 | Nesper et al. |
| 6,898,498 B1 | 5/2005 | Wessels et al. |

FOREIGN PATENT DOCUMENTS

| | | |
|---|---|---|
| DE | 19719454 | 1/1999 |
| DE | 10361095 | 7/2005 |
| EP | 1225100 | 7/2002 |
| EP | 1607273 | 12/2005 |
| JP | 2001-018744 | 1/2001 |

*Primary Examiner* — Paul N Dickson
*Assistant Examiner* — Wesley Potter
(74) *Attorney, Agent, or Firm* — Steptoe & Johnson LLP

(57) ABSTRACT

The vehicle collision decision apparatus has first acceleration detectors and a second acceleration detector for detecting an acceleration of the vehicle in a longitudinal direction, and third acceleration detectors for detecting an acceleration of the vehicle in a transverse direction thereof. When the vehicle is involved in an offset collision, the front airbags of the vehicle are activated based on accelerations detected by the first acceleration detectors and the second acceleration detector. Thereafter, the curtain airbags of the vehicle are reliably activated.

12 Claims, 9 Drawing Sheets

VEHICLE COLLISION DECISION APPARATUS

CLAIM OF PRIORITY

This application claims priority under 35 USC 119 to Japanese Patent Application No. 2007-269068, filed on Oct. 16, 2007, which is incorporated by reference in its entirety.

BACKGROUND OF THE INVENTION

1. Field of the Invention

The present invention relates to a vehicle collision decision apparatus, and more particularly to a vehicle collision decision apparatus that activates a vehicle occupant protection device based on accelerations detected by a plurality of acceleration detectors mounted on the vehicle.

2. Description of the Related Art

Generally, vehicles are equipped with airbags, which serve as restraint devices for protecting vehicle occupants from injury in the event of a vehicle collision. One known vehicle collision decision apparatus for activating curtain airbags, which form a type of airbag restraint, is disclosed in Japanese Laid-Open Patent Publication No. 2001-018744, for example.

According to Japanese Laid-Open Patent Publication No. 2001-018744, acceleration sensors for detecting transverse accelerations of a vehicle are mounted in side panels near the front seats of the vehicle, in side panels near the rear seats of the vehicle, and in a transversely central region of the vehicle. The curtain airbags are activated based on accelerations detected by the respective acceleration sensors.

If the vehicle hits an object in a one-sided head-on collision, i.e., a so-called offset collision, and the direction in which the hitting vehicle is retracted from the hit object is oblique to the direction in which the hitting vehicle has traveled prior to the collision, then the curtain airbags possibly may not be activated, due to the relationship between the installed positions of the acceleration sensors and the direction in which the acceleration sensors have detected the accelerations.

SUMMARY OF THE INVENTION

It is an object of the present invention to provide a vehicle collision decision apparatus, which is capable of reliably activating curtain airbags through a simple processing configuration in the event of an offset collision.

According to an aspect of the present invention, there is provided a vehicle collision decision apparatus comprising a vehicle occupant protection device for protecting an occupant of a vehicle, a first acceleration detector disposed in a front end of the vehicle for detecting an acceleration of the vehicle in a longitudinal direction thereof, a second acceleration detector disposed in a transversely central region of the vehicle near a front portion thereof for detecting an acceleration of the vehicle, a third acceleration detector disposed on a side of the vehicle near a seat disposed in the vehicle for detecting an acceleration of the vehicle in a transverse direction thereof, a first comparator for comparing a value based on the acceleration detected by the first acceleration detector with a first threshold value, and outputting a first comparison signal if the value based on the acceleration detected by the first acceleration detector is greater than the first threshold value, a second comparator for comparing a value based on the acceleration in the longitudinal direction of the vehicle detected by the second acceleration detector with a second threshold value, and outputting a second comparison signal if the value based on the acceleration detected by the second acceleration detector is greater than the second threshold value, and a third comparator for comparing a value based on the acceleration detected by the third acceleration detector with a third threshold value, and outputting a third comparison signal if the value based on the acceleration detected by the third acceleration detector is greater than the third threshold value, wherein the vehicle occupant protection device is activated when the first, second, and third comparators output the first comparison signal, the second comparison signal, and the third comparison signal.

According to another aspect of the present invention, there is provided a vehicle collision decision apparatus comprising a vehicle occupant protection device for protecting an occupant of a vehicle, a second acceleration detector disposed in a transversely central region of the vehicle near a front portion thereof for detecting an acceleration of the vehicle, a third acceleration detector disposed on a side of the vehicle near a seat disposed in the vehicle for detecting an acceleration of the vehicle in a transverse direction thereof, a fourth comparator for comparing a value based on the acceleration in the transverse direction of the vehicle detected by the second acceleration detector with a fourth threshold value, and outputting a fourth comparison signal if the value based on the acceleration detected by the second acceleration detector is greater than the fourth threshold value, and a fifth comparator for comparing a value based on the acceleration detected by the third acceleration detector with a fifth threshold value, and outputting a fifth comparison signal if the value based on the acceleration detected by the third acceleration detector is greater than the fifth threshold value, wherein the vehicle occupant protection device is activated when the fourth and fifth comparators output the forth comparison signal and the fifth comparison signal.

According to still another aspect of the present invention, there is provided a vehicle collision decision apparatus comprising a vehicle occupant protection device for protecting an occupant of a vehicle, a first acceleration detector disposed in a front end of the vehicle for detecting an acceleration of the vehicle in a longitudinal direction thereof, a second acceleration detector disposed in a transversely central region of the vehicle near a front portion thereof for detecting an acceleration of the vehicle, a third acceleration detector disposed on a side of the vehicle near a seat disposed in the vehicle for detecting an acceleration of the vehicle in a transverse direction thereof, a first comparator for comparing a value based on the acceleration detected by the first acceleration detector with a first threshold value, and outputting a first comparison signal if the value based on the acceleration detected by the first acceleration detector is greater than the first threshold value, a second comparator for comparing a value based on the acceleration in the longitudinal direction of the vehicle detected by the second acceleration detector with a second threshold value, and outputting a second comparison signal if the value based on the acceleration detected by the second acceleration detector is greater than the second threshold value, a third comparator for comparing a value based on the acceleration detected by the third acceleration detector with a third threshold value, and outputting a third comparison signal if the value based on the acceleration detected by the third acceleration detector is greater than the third threshold value, a fourth comparator for comparing a value based on the acceleration in the transverse direction of the vehicle detected by the second acceleration detector with a fourth threshold value, and outputting a fourth comparison signal if the value based on the acceleration detected by the second acceleration detector is greater than the fourth threshold value, and a fifth comparator for comparing a value based on the acceleration detected by the third acceleration detector with a fifth threshold value, and outputting a fifth comparison signal if the value based on the acceleration detected by the third acceleration detector is greater than the fifth threshold value, wherein the vehicle occupant protection device is activated when the first, second, and third comparators output the first comparison signal, the second comparison signal, and the third comparison signal, or when the fourth and fifth comparators output the forth comparison signal and the fifth comparison signal.

The vehicle collision decision apparatus further comprises a sixth comparator for comparing the value based on the acceleration in the longitudinal direction of the vehicle detected by the second acceleration detector with a sixth threshold value, and outputting a sixth comparison signal if the value based on the acceleration detected by the second acceleration detector is greater than the sixth threshold value, wherein the sixth threshold value is smaller than the second threshold value, and the vehicle occupant protection device is activated after a front airbag in the vehicle has been activated based on the first comparison signal and the sixth comparison signal.

Preferably, the first comparator compares an interval integral of the acceleration detected by the first acceleration detector with the first threshold value, and outputs the first comparison signal if the interval integral of the acceleration detected by the first acceleration detector is greater than the first threshold value, the second comparator compares a cumulative integral of the acceleration in the longitudinal direction of the vehicle detected by the second acceleration detector with the second threshold value, and outputs the second comparison signal if the cumulative integral of the acceleration in the longitudinal direction of the vehicle is greater than the second threshold value, and the third comparator compares a cumulative integral of the acceleration detected by the third acceleration detector with the third threshold value and outputs the third comparison signal if the cumulative integral of the acceleration detected by the third acceleration detector is greater than the third threshold value.

Preferably, the fourth comparator compares an interval integral of the acceleration in the transverse direction of the vehicle detected by the second acceleration detector with the fourth threshold value, and outputs the fourth comparison signal if the interval integral of the acceleration detected by the second acceleration detector is greater than the fourth threshold value, and the fifth comparator compares an interval integral of the acceleration detected by the third acceleration detector with the fifth threshold value, and outputs the fifth comparison signal if the interval integral of the acceleration detected by the third acceleration detector is greater than the fifth threshold value.

Preferably, the sixth comparator compares a cumulative integral of the acceleration in the longitudinal direction of the vehicle detected by the second acceleration detector with the sixth threshold value, and outputs the sixth comparison signal if the cumulative integral of the acceleration in the longitudinal direction of the vehicle is greater than the sixth threshold value. The first threshold value is preferably smaller than the second threshold value. The vehicle occupant protection device preferably comprises a curtain airbag.

When the vehicle is involved in an offset collision, the first acceleration detector and the second acceleration detector detect the acceleration of the vehicle in the longitudinal direction thereof, whereas the third acceleration detector detects the acceleration of the vehicle in the transverse direction thereof. The front airbag is activated based on the acceleration detected by the first acceleration detector, the acceleration of the vehicle in the longitudinal direction thereof detected by the second acceleration detector, and the acceleration of the vehicle in the longitudinal direction thereof detected by the third acceleration detector. Thereafter, the vehicle occupant protection device is reliably activated. The interval integrals or the cumulative intervals are used selectively, depending on the accelerations detected by the acceleration detectors. Therefore, the vehicle collision decision apparatus is of a simple arrangement.

When the vehicle hits an object in an offset collision, and the hitting vehicle is retracted from the object in a direction oblique to the direction in which the hitting vehicle has traveled prior to the collision, the second acceleration detector and the third acceleration detector detect the acceleration of the vehicle in the transverse direction, and the vehicle occupant protection device is reliably activated based on the acceleration of the vehicle in the transverse direction as detected by the second acceleration detector, and the acceleration detected by the third acceleration detector.

The vehicle occupant protection device is prevented from being activated in error when the doors of the vehicle are opened and closed. If the angle of the retracted direction to the traveled direction is smaller than a predetermined angle that occurs during an offset collision, then the vehicle occupant protection device is activated based on the acceleration detected by the first acceleration detector, the acceleration of the vehicle in the longitudinal direction as detected by the second acceleration detector, and the acceleration of the vehicle in the longitudinal direction as detected by the third acceleration detector. If the angle of the retracted direction to the traveled direction is equal to or greater than the predetermined angle that occurs during an offset collision, then the vehicle occupant protection device is activated based on the acceleration of the vehicle in the transverse direction thereof as detected by the second acceleration detector and the acceleration detected by the third acceleration detector. As a result, the vehicle occupant protection device is reliably activated, irrespective of the angle of the retracted direction to the traveled direction of the vehicle that occurs during an offset collision.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
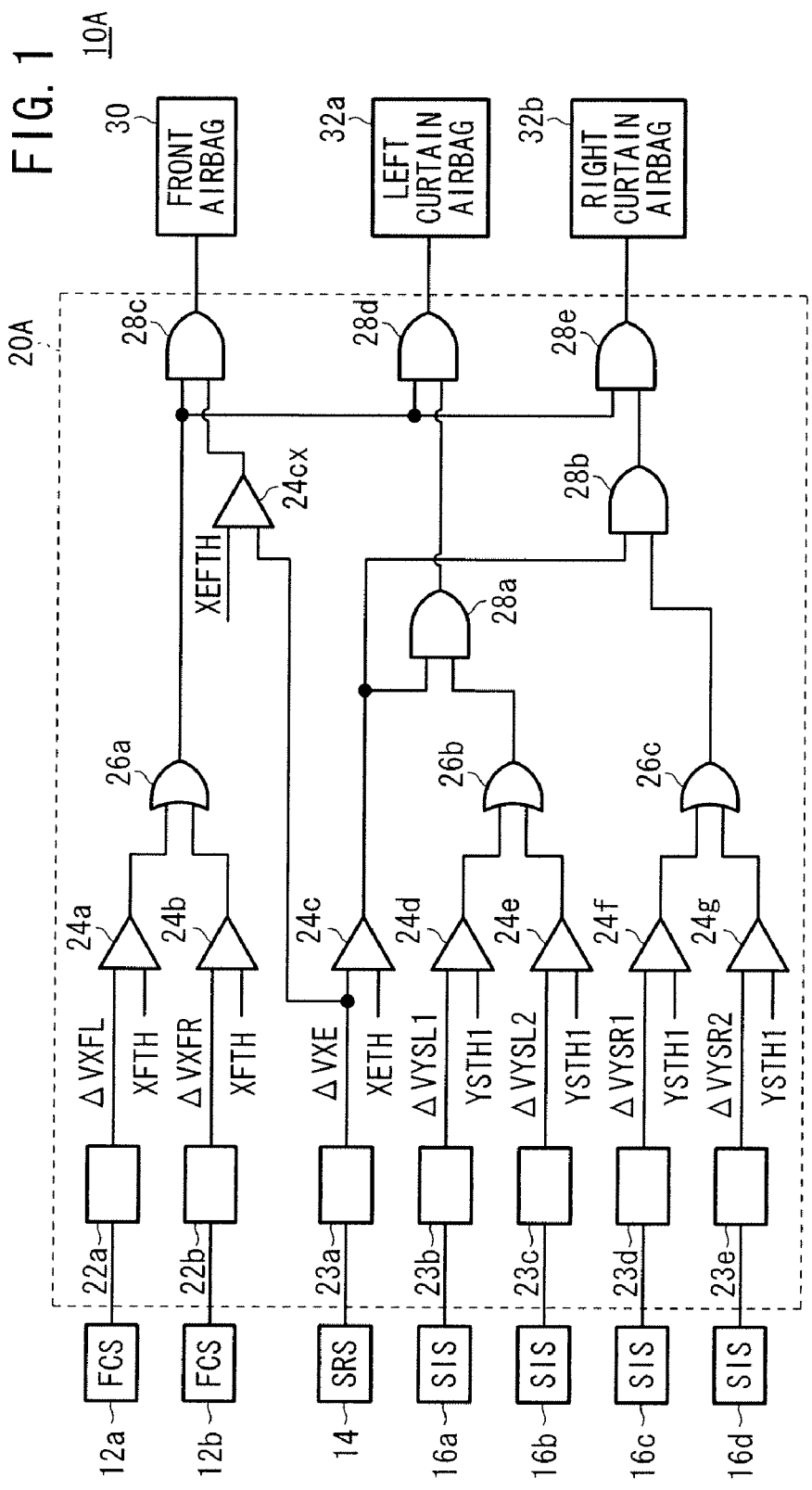
FIG. 1 is a block diagram of a vehicle collision decision apparatus according to a first embodiment of the present invention.

Like or corresponding parts of the invention are denoted by like or corresponding reference characters throughout the views.

Figure 2:
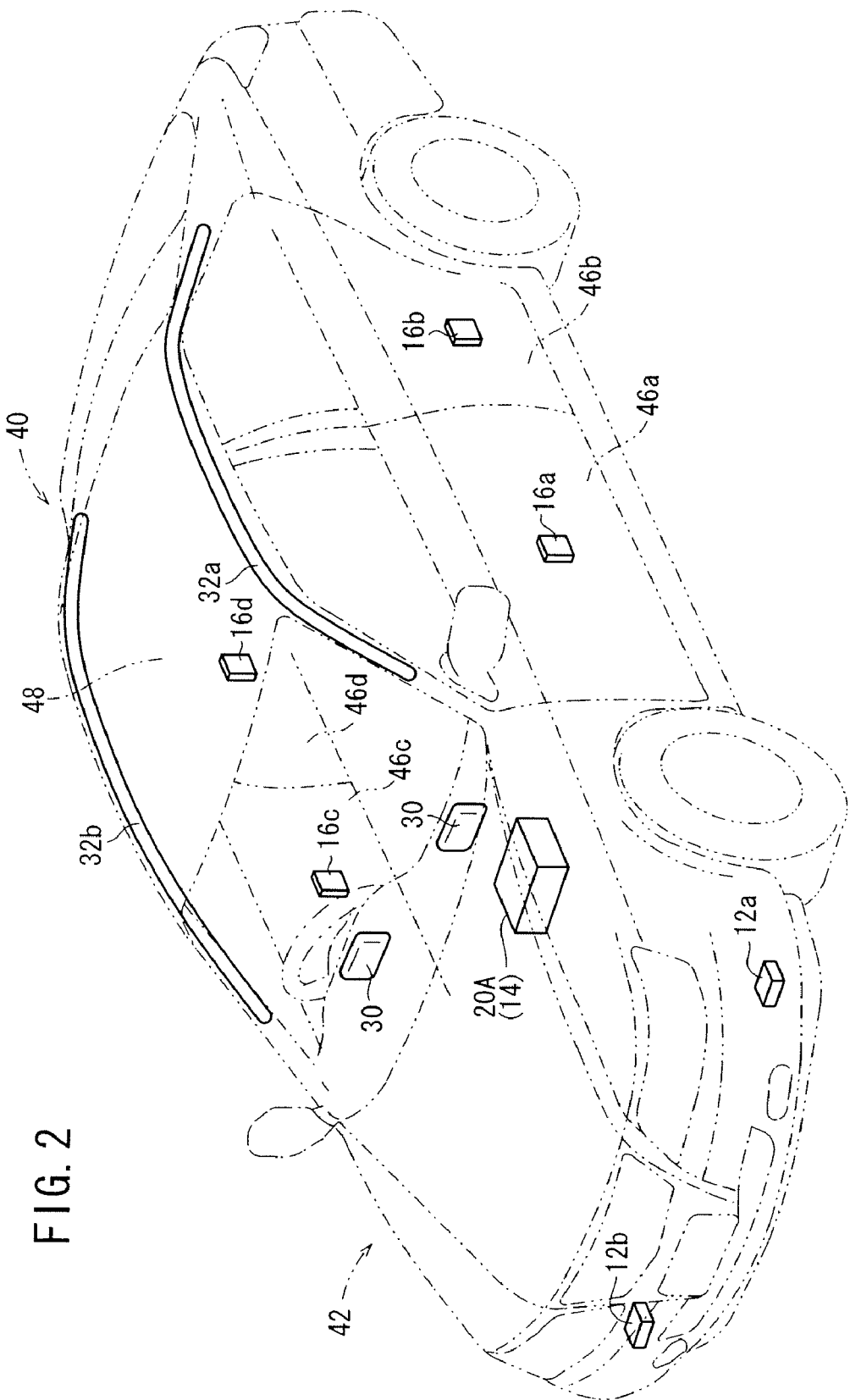
FIG. 2 is a schematic perspective view of a vehicle incorporating the vehicle collision decision apparatus according to the first embodiment shown in FIG. 1.
Figure 3:
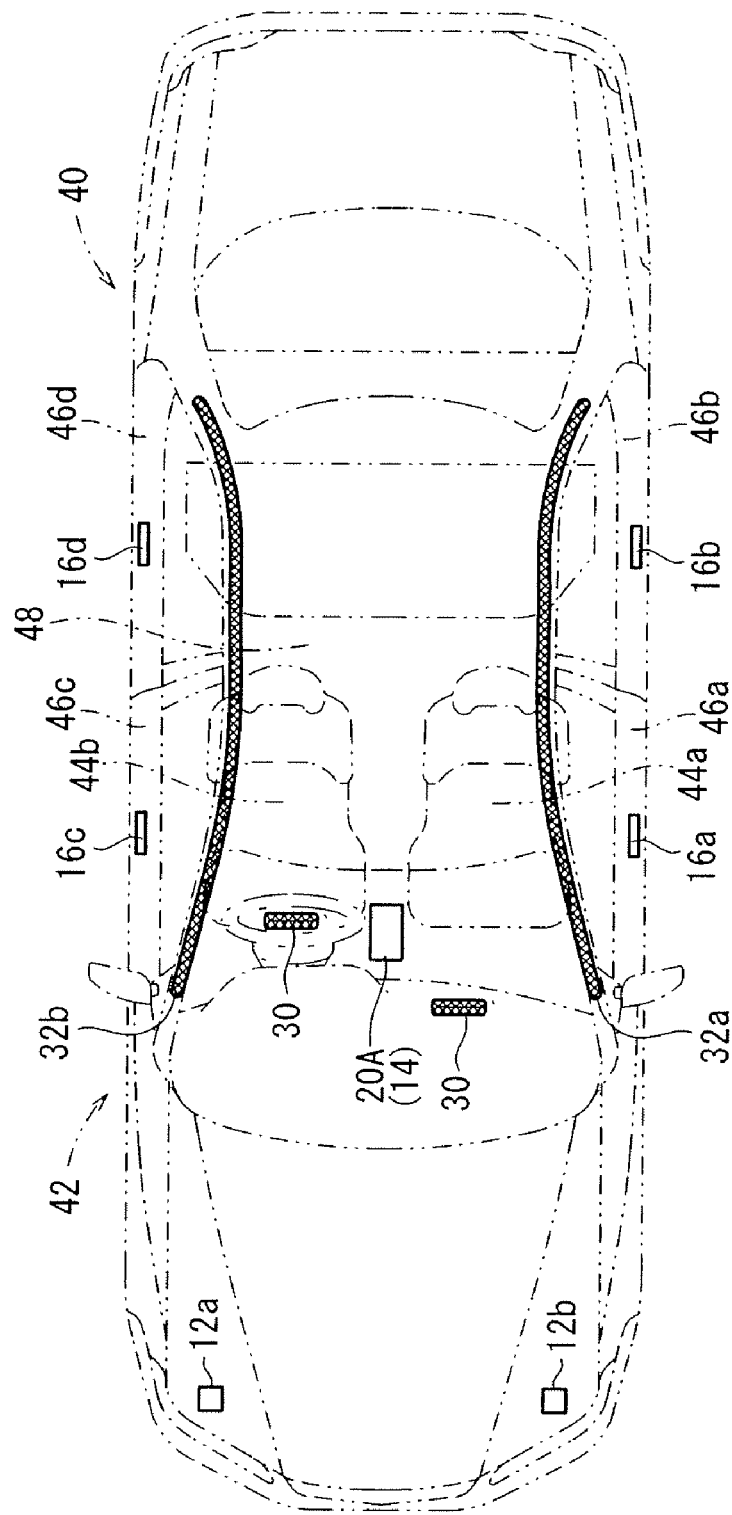
FIG. 3 is a schematic plan view of a vehicle incorporating the vehicle collision decision apparatus according to the first embodiment shown in FIG. 1.

First, a vehicle collision decision apparatus according to a first embodiment of the present invention will be described in detail below with reference to FIGS. 1 through 4. FIG. 1 shows in block form a vehicle collision decision apparatus 10A according to a first embodiment of the present invention. FIG. 2 shows in schematic perspective a vehicle 40, which forms a mobile body incorporating the vehicle collision decision apparatus 10A shown in FIG. 1. FIG. 3 shows a schematic plan view of the vehicle 40, which incorporates the vehicle collision decision apparatus 10A.

As shown in FIGS. 1 through 3, the vehicle collision decision apparatus 10A comprises first acceleration detectors (FCS) 12a, 12b, a second acceleration detector (SRS) 14, third acceleration detectors (SIS) 16a through 16d, a collision decision device 20A, front airbags 30, and curtain airbags (vehicle occupant protection devices) 32a, 32b.

The first acceleration detectors 12a, 12b comprise acceleration sensors for detecting an acceleration of the vehicle 40 in a longitudinal direction thereof, and are disposed in respective transversely spaced, symmetrical positions on a front portion 42 of the vehicle 40. The second acceleration detector 14 comprises an acceleration sensor for detecting accelerations of the vehicle 40 in longitudinal and transverse directions of the vehicle 40. The second acceleration detector 14 is disposed in a transversely central region of the vehicle 40 near the front portion 42, or more specifically, at a position between a left front seat 44a and a right front seat 44b of the vehicle 40. The third acceleration detectors 16a through 16d comprise acceleration sensors for detecting an acceleration of the vehicle 40 in a transverse direction thereof, and are disposed in respective doors 46a through 46d of the vehicle 40. Specifically, the third acceleration detector 16a is disposed in a left front door 46a near the left front seat 44a, the third acceleration detector 16b is disposed in a left rear door 46b near a rear seat, the third acceleration detector 16c is disposed in a right front door 46c near the right front seat 44b, and the third acceleration detector 16d is disposed in a right rear door 46d near the rear seat.

The collision decision device 20A comprises interval integrators 22a, 22b, cumulative integrators 23a through 23e, comparators 24a through 24g and 24cx, OR gates 26a through 26c, and AND gates 28a through 28e.

The interval integrators 22a, 22b perform interval integrations based on accelerations detected by the first acceleration detectors 12a, 12b, and output respective interval integrals to the comparators 24a and 24b, respectively. The term "interval integrals" refers to values that are calculated when the accelerations detected by the first acceleration detectors 12a, 12b are integrated within a time range that is determined based on the interval at which the accelerations are detected by the first acceleration detectors 12a, 12b. The time range is determined as a given multiple of the interval at which the accelerations are detected by the first acceleration detectors 12a, 12b.

The interval integrator 22a outputs an interval integral $\Delta VXFL$, which is calculated from the acceleration detected by the first acceleration detector 12a, to the comparator 24a. The interval integrator 22b outputs an interval integral $\Delta VXFR$, which is calculated from the acceleration detected by the second acceleration detector 12b, to the comparator 24b.

The cumulative integrators 23a through 23e perform cumulative integration on accelerations detected by the second acceleration detector 14 and the third acceleration detectors 16a through 16d, and output respective cumulative integrals to the comparators 24c through 24g and 24cx. The term "cumulative integrals" refers to values that are calculated when the accelerations detected by the second acceleration detector 14 and the third acceleration detectors 16a through 16d are integrated, during a period of time from a time when the second acceleration detector 14 and the third acceleration detectors 16a through 16d begin detecting respective accelerations, to a time when the acceleration detectors stop detecting the respective accelerations, i.e., when the detected accelerations become nil.

The cumulative integrator 23a outputs a cumulative integral $\Delta VXE$, which is calculated from the acceleration in the longitudinal direction of the vehicle 40 detected by the second acceleration detector 14, to the comparators 24c and 24cx. The cumulative integrator 23b outputs a cumulative integral $\Delta VYSL1$, which is calculated from the acceleration detected by the third acceleration detector 16a, to the comparator 24d. The cumulative integrator 23c outputs a cumulative integral $\Delta VYSL2$, which is calculated from the acceleration detected by the third acceleration detector 16b, to the comparator 24e. The cumulative integrator 23d outputs a cumulative integral $\Delta VYSR1$, which is calculated from the acceleration detected by the third acceleration detector 16c, to the comparator 24f. The cumulative integrator 23e outputs a cumulative integral $\Delta VYSR2$, which is calculated from the acceleration detected by the third acceleration detector 16d, to the comparator 24g.

The comparators 24a through 24g and 24cx compare the interval integrals output from the interval integrators 22a, 22b and the cumulative integrals output from the cumulative integrators 23a through 23e with threshold values, which are set in the respective comparators 24a through 24g and 24cx, and output comparison signals based on the compared results to the OR gates 26a through 26c.

Specifically, the comparator (first comparator) 24a compares the interval integral $\Delta VXFL$ output from the interval integrator 22a with a threshold value XFTH (first threshold value), and outputs a first comparison signal to the OR gate 26a if the interval integral $\Delta VXFL$ is greater than the threshold value XFTH. The comparator (first comparator) 24b compares the interval integral $\Delta VXFR$ output from the interval integrator 22b with the threshold value XFTH, and outputs a first comparison signal to the OR gate 26a if the interval integral $\Delta VXFR$ is greater than the threshold value XFTH.

The comparator (second comparator) 24c compares the interval integral $\Delta VXE$ output from the interval integrator 23a with a threshold value XETH (second threshold value), and outputs a second comparison signal to the AND gates 28a, 28b if the interval integral $\Delta VXE$ is greater than the threshold value XETH.

The comparator (third comparator) 24d compares the interval integral $\Delta VYSL1$ output from the interval integrator 23b with a threshold value YSTH1 (third threshold value), and outputs a third comparison signal to the OR gate 26b if the interval integral $\Delta VYSL1$ is greater than the threshold value YSTH1. The comparator (third comparator) 24e compares the interval integral ΔVYSL2 output from the interval integrator 23c with the threshold value YSTH1, and outputs a third comparison signal to the OR gate 26b if the interval integral ΔVYSL2 is greater than the threshold value YSTH1.

The comparator (third comparator) 24f compares the interval integral ΔVYSR1 output from the interval integrator 23d with the threshold value YSTH1, and outputs a third comparison signal to the OR gate 26c if the interval integral ΔVYSR1 is greater than the threshold value YSTH1. The comparator (third comparator) 24g compares the interval integral ΔVYSR2 output from the interval integrator 23e with the threshold value YSTH1, and outputs a third comparison signal to the OR gate 26c if the interval integral ΔVYSR2 is greater than the threshold value YSTH1.

The comparator (sixth comparator) 24cx compares the interval integral ΔVXE output from the interval integrator 23a with a threshold value XEFTH (sixth threshold value), and outputs a sixth comparison signal to the AND gate 28c if the interval integral ΔVXE is greater than the threshold value XEFTH.

The threshold values set in the comparators 24a through 24g, 24cx may be of any values, insofar as they allow the front airbags 30 and the curtain airbags 32a, 32b to be activated appropriately. For example, the threshold value XFTH set in the comparators 24a, 24b may be smaller than the threshold value XETH set in the comparator 24c. Preferably, the threshold values XFTH, XETH, YSTH1 should be 5 km/h, 20 km/h, and 10 km/h, respectively, each of which is expressed as a speed change per unit time. The threshold value XFTH may be smaller than the threshold value XETH in order to quickly detect a head-on collision of the vehicle 40. The threshold value set in the comparator 24cx may be smaller than the threshold value set in the comparator 24c in order to activate the front airbags 30 earlier than the curtain airbags 32a, 32b, in the event that the vehicle 40 is involved in an offset collision.

The OR gates 26a through 26c perform OR operations on the comparison signals output from the comparators 24a through 24g. Specifically, the OR gate 26a performs an OR operation on the first comparison signals output from the comparators 24a, 24b, and outputs the ORed result to the AND gate 28c. The OR gate 26b performs an OR operation on the third comparison signals output from the comparators 24d, 24e, and outputs the ORed result to the AND gate 28a. The OR gate 26c performs an OR operation on the third comparison signals output from the comparators 24f, 24g, and outputs the ORed result to the AND gate 28b.

The AND gate 28a performs an AND operation on the second comparison signal output from the comparator 24c and the ORed result from the OR gate 26b, and outputs the ANDed result to the AND gate 28d. The AND gate 28b performs an AND operation on the second comparison signal output from the comparator 24c and the ORed result from the OR gate 26c, and outputs the ANDed result to the AND gate 28e. The AND gate 28c performs an AND operation on the ORed result from the OR gate 26a and the sixth comparison signal from the comparator 24cx, and outputs the ANDed result to the front airbags 30. The AND gate 28d performs an AND operation on the ORed result from the OR gate 26a and the ANDed result from the AND gate 28a, and outputs the ANDed result to the curtain airbag 32a. The AND gate 28e performs an AND operation on the ORed result from the OR gate 26a and the ANDed result from the AND gate 28b, and outputs the ANDed result to the curtain airbag 32b.

The front airbags 30, which are disposed respectively in front of the left and right front seats 44a, 44b, are activated when the AND gate 28c outputs a true-value signal to the front airbags 30. The curtain airbag 32a is disposed on a roof lining 48 of the vehicle 40 near the doors 46a, 46b and extends in the longitudinal direction of the vehicle 40. The curtain airbag 32a is activated when the AND gate 28d outputs a true-value signal to the curtain airbag 32a. The curtain airbag 32b is disposed on the roof lining 48 of the vehicle 40 near the doors 46c, 46d and extends in the longitudinal direction of the vehicle 40. The curtain airbag 32b is activated when the AND gate 28e outputs a true-value signal to the curtain airbag 32b.

The vehicle collision decision apparatus 10A according to the first embodiment basically is constructed as described above. Operations of the vehicle collision decision apparatus 10A will be described below with reference to the flowchart shown in FIG. 4.

When the vehicle 40 incorporating the vehicle collision decision apparatus 10A is involved in a vehicle collision, the first acceleration detectors 12a, 12b, the second acceleration detector 14, and the third acceleration detectors 16a through 16d detect a deceleration of the vehicle 40, which is caused by the vehicle collision, as respective accelerations in step S1.

The accelerations detected by the first acceleration detectors 12a, 12b, the second acceleration detector 14, and the third acceleration detectors 16a through 16d are output to the interval integrators 22a, 22b and the cumulative integrators 23a through 23e, and are integrated thereby in step S2.

Specifically, the acceleration detected by the first acceleration detector 12a is integrated by the interval integrator 22a, which outputs the interval integral ΔVXFL to the comparator 24a. The acceleration detected by the first acceleration detector 12b is integrated by the interval integrator 22b, which outputs the interval integral ΔVXFR to the comparator 24b. The acceleration detected by the second acceleration detector 14 is integrated by the cumulative integrator 23a, which outputs the cumulative integral ΔVXE to the comparators 24c, 24cx. The acceleration detected by the third acceleration detector 16a is integrated by the cumulative integrator 23b, which outputs the cumulative integral ΔVYSL1 to the comparator 24d. The acceleration detected by the third acceleration detector 16b is integrated by the cumulative integrator 23c, which outputs the cumulative integral ΔVYSL2 to the comparator 24e. The acceleration detected by the third acceleration detector 16c is integrated by the cumulative integrator 23d, which outputs the cumulative integral ΔVYSR1 to the comparator 24f. The acceleration detected by the third acceleration detector 16d is integrated by the cumulative integrator 23e, which outputs the cumulative integral ΔVYSR2 to the comparator 24g.

The comparator 24a compares the interval integral ΔVXFL and the threshold value XFTH with each other, whereas the comparator 24b compares the interval integral ΔVXFR and the threshold value XFTH with each other, in step S3. If the interval integral ΔVXFL is greater than the threshold value XFTH, then the comparator 24a outputs the first comparison signal to the OR gate 26a. If the interval integral ΔVXFR is greater than the threshold value XFTH, then the comparator 24b outputs the first comparison signal to the OR gate 26a. When the OR gate 26a is supplied with the first comparison signal from at least one of the comparators 24a, 24b, the OR gate 26a outputs a true-value signal to the AND gates 28c, 28d, and 28e. The true-value signal indicates that the first acceleration detectors 12a, 12b have recognized that a collision has occurred on the vehicle 40, which requires the front airbags 30 and the curtain airbags 32a, 32b to be activated.

The comparator 24cx compares the cumulative integral ΔVXE and the threshold value XEFTH with each other in step S4. If the interval integral ΔVXE is greater than the threshold value XEFTH, then the comparator 24cx outputs the sixth comparison signal to the AND gate 28c. When the AND gate 28c is supplied with the true-value signal from the OR gate 26a and the sixth comparison signal from the comparator 24cx, the AND gate 28c outputs a true-value signal to the front airbags 30, which are activated in step S5.

The comparator 24c compares the cumulative integral ΔVXE and the threshold value XETH with each other in step S6. If the cumulative integral ΔVXE is greater than the threshold value XETH, then the comparator 24c outputs the second comparison signal to the AND gates 28a, 28b.

The comparator 24d compares the cumulative integral ΔVYSL1 and the threshold value YSTH1 with each other, whereas the comparator 24e compares the cumulative integral ΔVYSL2 and the threshold value YSTH1 with each other, in step S7. If the cumulative integral ΔVYSL1 is greater than the threshold value YSTH1, then the comparator 24d outputs the third comparison signal to the OR gate 26b. If the cumulative integral ΔVYSL2 is greater than the threshold value YSTH1, then the comparator 24e outputs the third comparison signal to the OR gate 26b. When the OR gate 26b is supplied with the third comparison signal, from at least one of the comparators 24d, 24e, the OR gate 26b outputs a true-value signal to the AND gate 28a. The true-value signal indicates that the third acceleration detectors 16a, 16b have recognized that a collision has occurred on the vehicle 40, which requires the curtain airbag 32a to be activated.

When the AND gate 28a is supplied with the second comparison signal from the comparator 24c and the true-value signal from the OR gate 26b, the AND gate 28a outputs a true-value signal to the AND gate 28d. When the AND gate 28d is supplied with the true-value signal from the OR gate 26a and the true-value signal from the AND gate 28a, the AND gate 28d outputs a true-value signal to the curtain airbag 32a, which is then activated in step S8.

If the OR gate 26b does not output a true-value signal to the AND gate 28a, the comparator 24f compares the cumulative integral ΔVYSR1 and the threshold value YSTH1 with each other, while the comparator 24g compares the cumulative integral ΔVYSR2 and the threshold value YSTH1 with each other, in step S9. If the cumulative integral ΔVYSR1 is greater than the threshold value YSTH1, then the comparator 24f outputs the third comparison signal to the OR gate 26c. If the cumulative integral ΔVYSR2 is greater than the threshold value YSTH1, then the comparator 24g outputs the third comparison signal to the OR gate 26c. When the OR gate 26c is supplied with the third comparison signal from at least one of the comparators 24f, 24g, the OR gate 26c outputs a true-value signal to the AND gate 28b. The true-value signal indicates that the third acceleration detectors 16c, 16d have recognized that the vehicle 40 has been subjected to a sudden transverse movement, which requires the curtain airbag 32b to be activated.

When the AND gate 28b is supplied with the second comparison signal from the comparator 24c and the true-value signal from the OR gate 26c, the AND gate 28b outputs a true-value signal to the AND gate 28e. When the AND gate 28e is supplied with the true-value signal from the OR gate 26a and the true-value signal from the AND gate 28b, the AND gate 28e outputs a true-value signal to the curtain airbag 32b, which is then activated in step S10.

With the vehicle collision decision apparatus 10A according to the first embodiment, as described above, the first acceleration detectors 12a, 12b and the second acceleration detector 14 detect an acceleration of the vehicle 40 in the longitudinal direction thereof, whereas the third acceleration detectors 16a through 16d detect an acceleration of the vehicle 40 in the transverse direction thereof. When the vehicle 40 hits an object in an offset collision, the front airbags 30 are activated based on detected results from the first acceleration detectors 12a, 12b and the second acceleration detector 14. Thereafter, when the hitting vehicle 40 is retracted from the object in a direction oblique to the direction in which the hitting vehicle 40 has traveled prior to the collision, the curtain airbags 32a, 32b are activated in order to prevent the heads of vehicle occupants, which move transversely to the vehicle 40, from impinging upon and colliding against the doors 46a through 46d.

Figure 5:
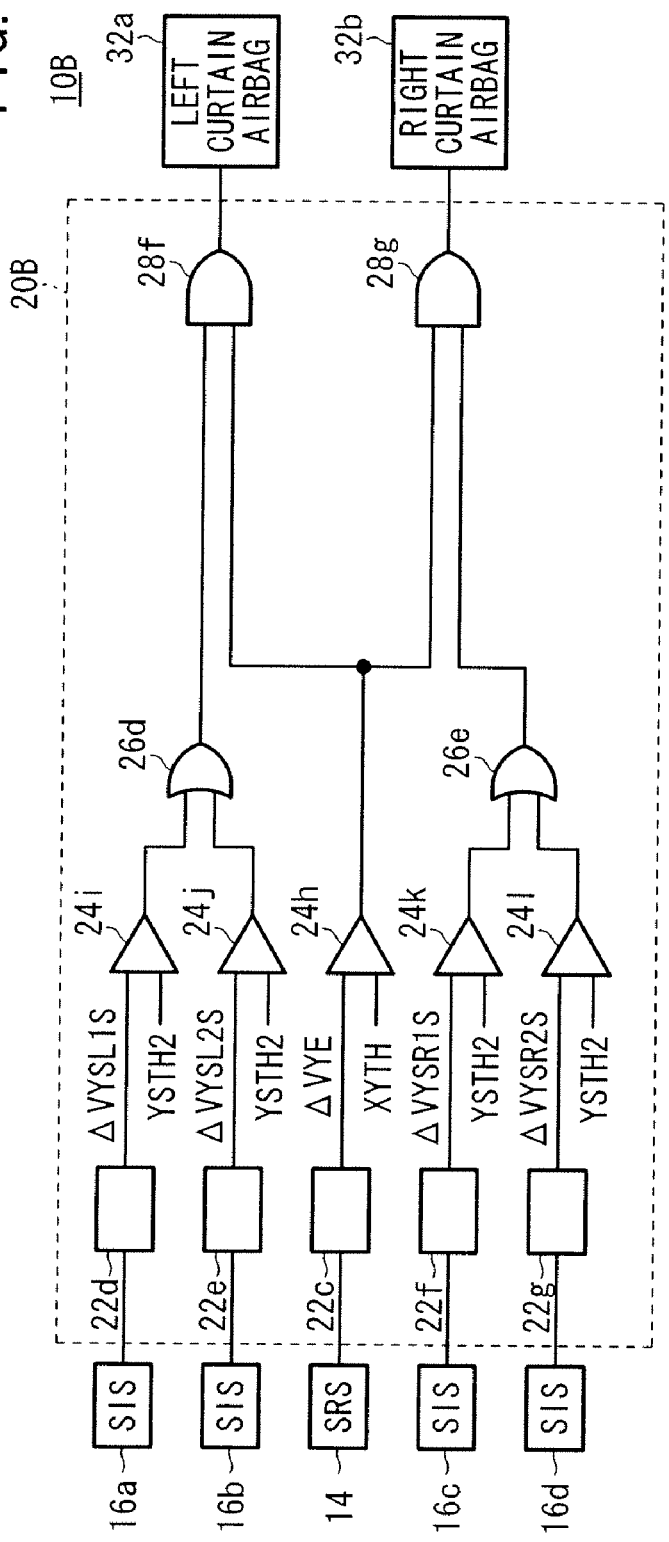
FIG. 5 is a block diagram of a vehicle collision decision apparatus according to a second embodiment of the present invention.
Figure 6:
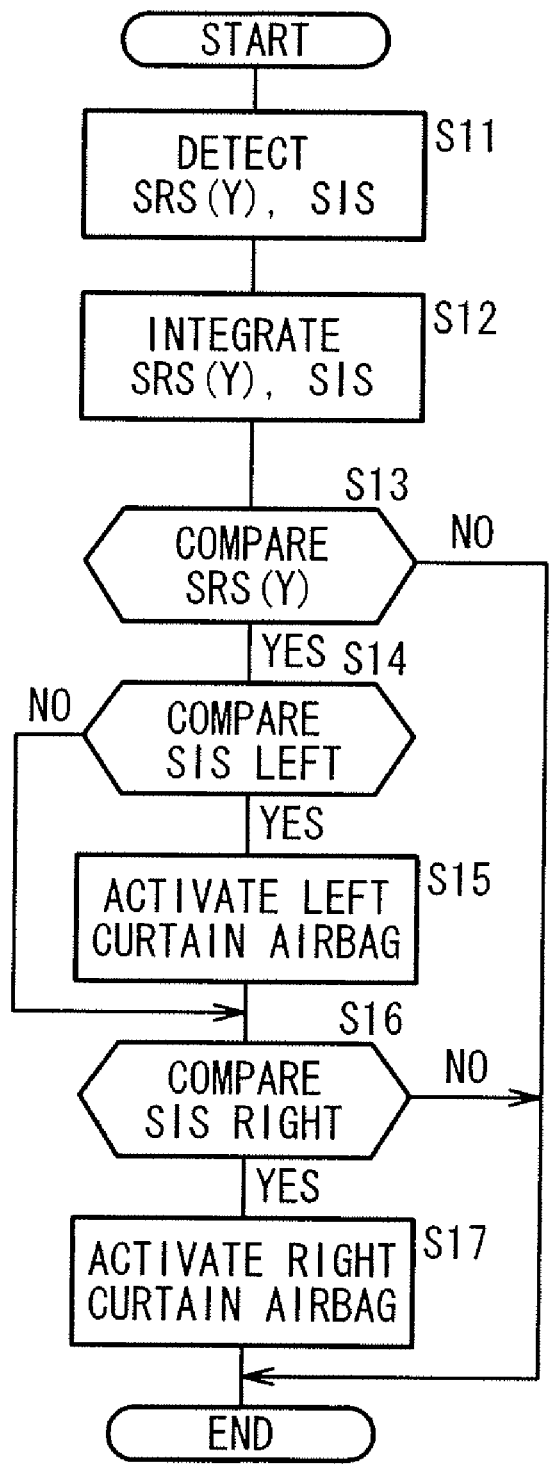
FIG. 6 is a flowchart of an operation sequence of the vehicle collision decision apparatus according to the second embodiment shown in FIG. 5.

A vehicle collision decision apparatus according to a second embodiment of the present invention will be described in detail below with reference to FIGS. 5 and 6. FIG. 5 shows in block form the vehicle collision decision apparatus 10B according to the second embodiment of the present invention.

As shown in FIG. 5, the vehicle collision decision apparatus 10B comprises a second acceleration detector (SRS) 14, third acceleration detectors (SIS) 16a through 16d, a collision decision device 20B, front airbags 30, and curtain airbags 32a, 32b.

The collision decision device 20B comprises interval integrators 22c through 22g, comparators 24h through 24l, OR gates 26d, 26e, and AND gates 28f, 28g.

The interval integrators 22c through 22g perform interval integration on the accelerations detected by the second acceleration detector 14 and the third acceleration detectors 16a through 16d, and output respective interval integrals to the comparators 24h through 24l, respectively. Specifically, the interval integrator 22c outputs an interval integral ΔVYE calculated from an acceleration in a transverse direction of the vehicle 40, which is detected by the second acceleration detector 14, to the comparator 24h. The interval integrator 22d outputs an interval integral ΔVYSL1S calculated from an acceleration, which is detected by the third acceleration detector 16a, to the comparator 24i. The interval integrator 22e outputs an interval integral ΔVYSL2S, which is calculated from an acceleration detected by the third acceleration detector 16b, to the comparator 24j. The interval integrator 22f outputs an interval integral ΔVYSR1S, which is calculated from an acceleration detected by the third acceleration detector 16c, to the comparator 24k. The interval integrator 22g outputs an interval integral ΔVYSR2S, which is calculated from an acceleration detected by the third acceleration detector 16d, to the comparator 24l.

The comparators 24h through 24l compare the interval integrals output from the interval integrators 22c through 22g with threshold values set in the respective comparators 24h through 24l, and output comparison signals based on the compared results to the OR gates 26d, 26e. Specifically, the comparator (fourth comparator) 24h compares the interval integral ΔVYE output from the interval integrator 22c with a threshold value XYTH (fourth threshold value), and outputs a fourth comparison signal to the AND gates 28f, 28g if the interval integral ΔVYE is greater than the threshold value XYTH. The comparator (fifth comparator) 24i compares the interval integral ΔVYSL1S output from the interval integrator 22d with a threshold value YSTH2 (fifth threshold value), and outputs a fifth comparison signal to the OR gate 26d if the interval integral ΔVYSL1S is greater than the threshold value YSTH2. The comparator (fifth comparator) 24j compares the interval integral ΔVYSL2S output from the interval integrator 22e with the threshold value YSTH2, and outputs a fifth comparison signal to the OR gate 26d if the interval integral ΔVYSL2S is greater than the threshold value YSTH2. The comparator (fifth comparator) 24k compares the interval integral ΔVYSR1S output from the interval integrator 22f with the threshold value YSTH2, and outputs a fifth comparison signal to the OR gate 26e if the interval integral ΔVYSR1S is greater than the threshold value YSTH2. The comparator (fifth comparator) 24l compares the interval integral ΔVYSR2S output from the interval integrator 22g with the threshold value YSTH2, and outputs a fifth comparison signal to the OR gate 26e if the interval integral ΔVYSR2S is greater than the threshold value YSTH2.

In the second embodiment, the second acceleration detector 14 and the third acceleration detectors 16a through 16d detect an acceleration of the vehicle 40 in the transverse direction thereof. The third acceleration detectors 16a through 16d are disposed respectively in the doors 46a through 46d of the vehicle 40. Therefore, the third acceleration detectors 16a through 16d detect an acceleration of the vehicle 40 in the transverse direction also when the doors 46a through 46d are opened and closed. However, even if the third acceleration detectors 16a through 16d detect an acceleration of the vehicle 40 in the transverse direction when the doors 46a through 46d are opened and closed, since the acceleration of the vehicle 40 in the transverse direction thereof, which is detected by the second acceleration detector 14, is usually small, the comparator 24h, which compares the interval integral ΔVYE and the threshold value XYTH, does not output the fourth comparison signal. Accordingly, the curtain airbags 32a, 32b are prevented from being activated in error.

The threshold values set in the comparators 24h through 24l may be of any values, insofar as such values allow the curtain airbags 32a, 32b to be activated appropriately. Preferably, the threshold values XYTH, YSTH2 should be 1 km/h and 5 km/h, respectively, each of which is expressed as a speed change per unit time.

The OR gates 26d, 26e perform an OR operation on the comparison signals output from the comparators 24h through 24l. Specifically, the OR gate 26d performs an OR operation on the fifth comparison signals output from the comparators 24i, 24j, and outputs the ORed result to the AND gate 28f. The OR gate 26e performs an OR operation on the fifth comparison signals output from the comparators 24k, 24l, and outputs the ORed result to the AND gate 28g.

The AND gate 28f performs an AND operation on the ORed result from the OR gate 26d and the fourth comparison signal output from the comparator 24h, and outputs the ANDed result to the curtain airbag 32a. The AND gate 28g performs an AND operation on the ORed result from the OR gate 26e and the fourth comparison signal output from the comparator 24h, and outputs the ANDed result to the curtain airbag 32b.

The curtain airbag 32a is activated when the AND gate 28f outputs a true-value signal to the curtain airbag 32a. The curtain airbag 32b is activated when the AND gate 28g outputs a true-value signal to the curtain airbag 32b.

The vehicle collision decision apparatus 10B according to the second embodiment basically is constructed as described above. Operations of the vehicle collision decision apparatus 10B will be described below with reference to the flowchart shown in FIG. 6.

When the vehicle 40, incorporating the vehicle collision decision apparatus 10B therein, is involved in a vehicle collision, the second acceleration detector 14 and the third acceleration detectors 16a through 16d detect the deceleration of the vehicle 40, which is caused by the vehicle collision, as respective accelerations in step S11.

The accelerations detected by the second acceleration detector 14 and the third acceleration detectors 16a through 16d are output to the interval integrators 22c through 22g and are integrated thereby in step S12. Specifically, the acceleration detected by the second acceleration detector 14 is integrated by the interval integrator 22c, which outputs the interval integral ΔVYE to the comparator 24h. The acceleration detected by the third acceleration detector 16a is integrated by the interval integrator 22d, which outputs the interval integral ΔVYSL1S to the comparator 24i. The acceleration detected by the third acceleration detector 16b is integrated by the interval integrator 22e, which outputs the interval integral ΔVYSL2S to the comparator 24j. The acceleration detected by the third acceleration detector 16c is integrated by the interval integrator 22f, which outputs the interval integral ΔVYSR1S to the comparator 24k. The acceleration detected by the third acceleration detector 16d is integrated by the interval integrator 22g, which outputs the interval integral ΔVYSR2S to the comparator 24l.

The comparator 24h compares the interval integral ΔVYE and the threshold value XYTH with each other in step S13. If the interval integral ΔVYE is greater than the threshold value XYTH, then the comparator 24h outputs the fourth comparison signal to the AND gates 28f, 28g.

The comparator 24i compares the interval integral ΔVYSL1S and the threshold value XSTH2 with each other, and the comparator 24j compares the interval integral ΔVYSL2S and the threshold value XSTH2 with each other, in step S14. If the interval integral ΔVYSL1S is greater than the threshold value XSTH2, then the comparator 24i outputs the fifth comparison signal to the OR gate 26d. If the interval integral ΔVYSL2S is greater than the threshold value XSTH2, then the comparator 24j outputs the fifth comparison signal to the OR gate 26d. When the OR gate 26d is supplied with the fifth comparison signal from at least one of the comparators 24i, 24j, the OR gate 26d outputs a true-value signal to the AND gate 28f. The true-value signal indicates that the third acceleration detectors 16a, 16b have recognized that a collision has occurred on the vehicle 40, which requires the curtain airbag 32a to be activated.

When the AND gate 28f is supplied with the fourth comparison signal from the comparator 24h and the true-value signal from the OR gate 26d, the AND gate 28f outputs a true-value signal to the curtain airbag 32a, which is then activated in step S15.

If the OR gate 26d does not output a true-value signal to the AND gate 28f, the comparator 24k compares the interval integral ΔVYSR1S and the threshold value YSTH2 with each other, whereas the comparator 24l compares the cumulative integral ΔVYSR2S and the threshold value YSTH2 with each other in step S16. If the interval integral ΔVYSR1S is greater than the threshold value YSTH2, then the comparator 24k outputs the fifth comparison signal to the OR gate 26e. If the interval integral ΔVYSR2S is greater than the threshold value YSTH2, then the comparator 24l outputs the fifth comparison signal to the OR gate 26e. When the OR gate 26e is supplied with the fifth comparison signal from at least one of the comparators 24k and 24l, the OR gate 26e outputs a true-value signal to the AND gate 28g. The true-value signal indicates that the third acceleration detectors 16c, 16d have recognized that the vehicle 40 has been subjected to a collision or a sudden transverse movement, which requires the curtain airbag 32b to be activated.

When the AND gate 28g is supplied with the fourth comparison signal from the comparator 24h and the true-value signal from the OR gate 26e, the AND gate 28g outputs a true-value signal to the curtain airbag 32b, which is then activated in step S17.

With the vehicle collision decision apparatus 10B according to the second embodiment, as described above, the second acceleration detector 14 and the third acceleration detectors 16a through 16d detect an acceleration of the vehicle 40 in the longitudinal direction thereof. When the vehicle 40 hits an object in an offset collision, and the hitting vehicle 40 is retracted from the object in a direction oblique to the direction in which the hitting vehicle 40 has traveled prior to the collision, the curtain airbags 32a, 32b are reliably activated assuming that the angle of the retracted direction to the traveled direction is equal to or greater than a predetermined angle. The curtain airbags 32a, 32b are prevented from being activated in error, when the doors 46a through 46d are opened and closed.

Figure 7:
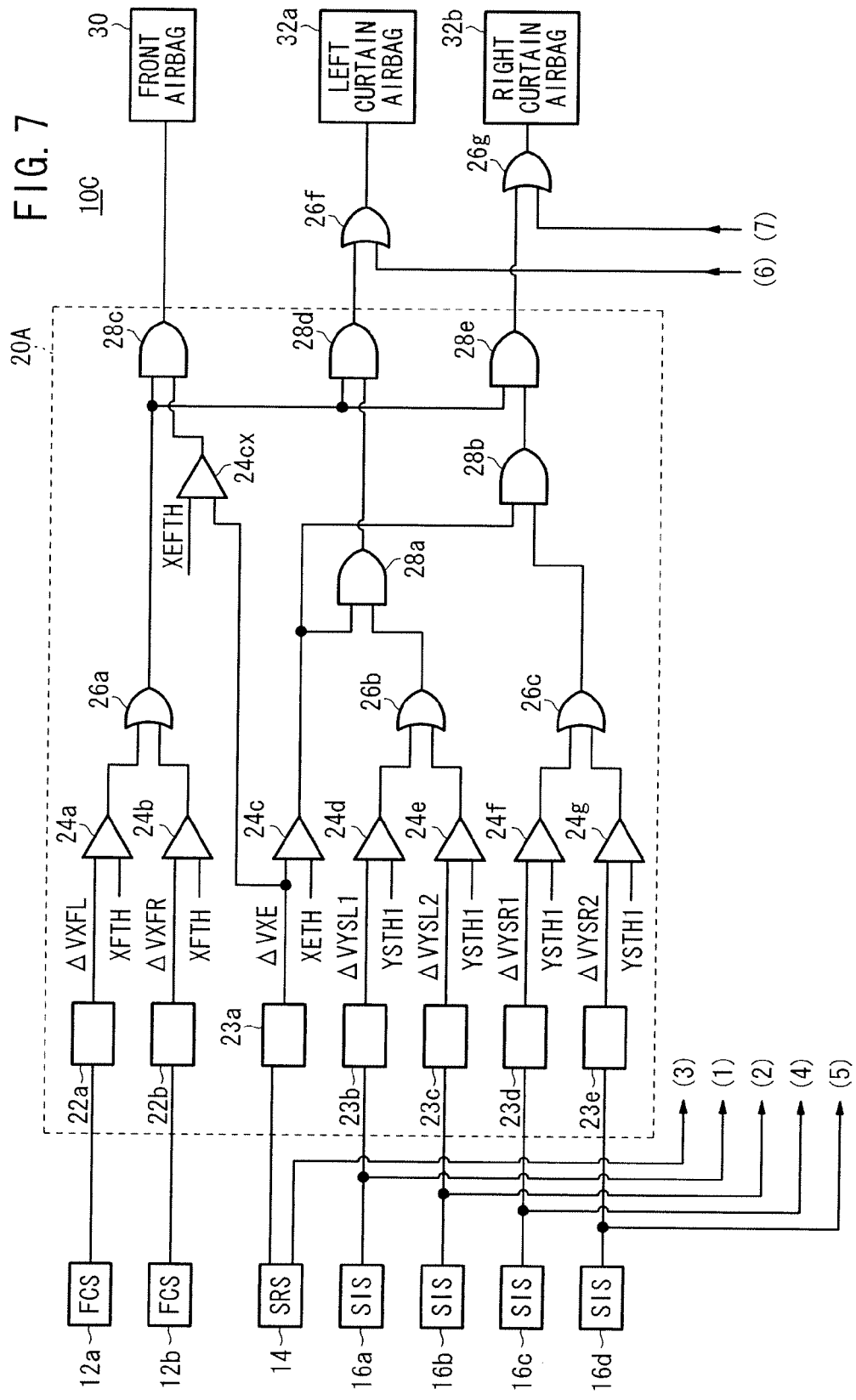
FIGS. 7 and 8 are block diagrams of a vehicle collision decision apparatus according to a third embodiment of the present invention.
Figure 8:
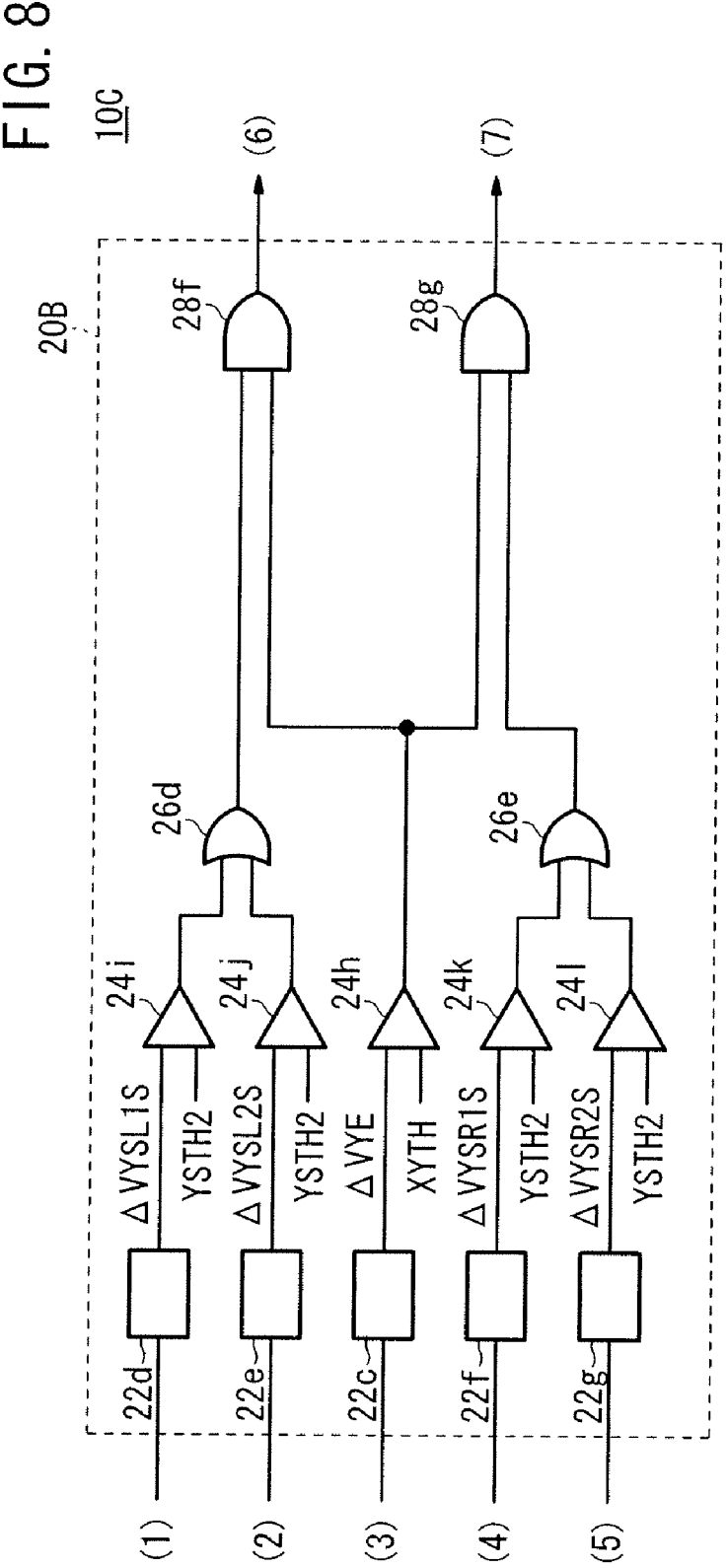
Figure 9:
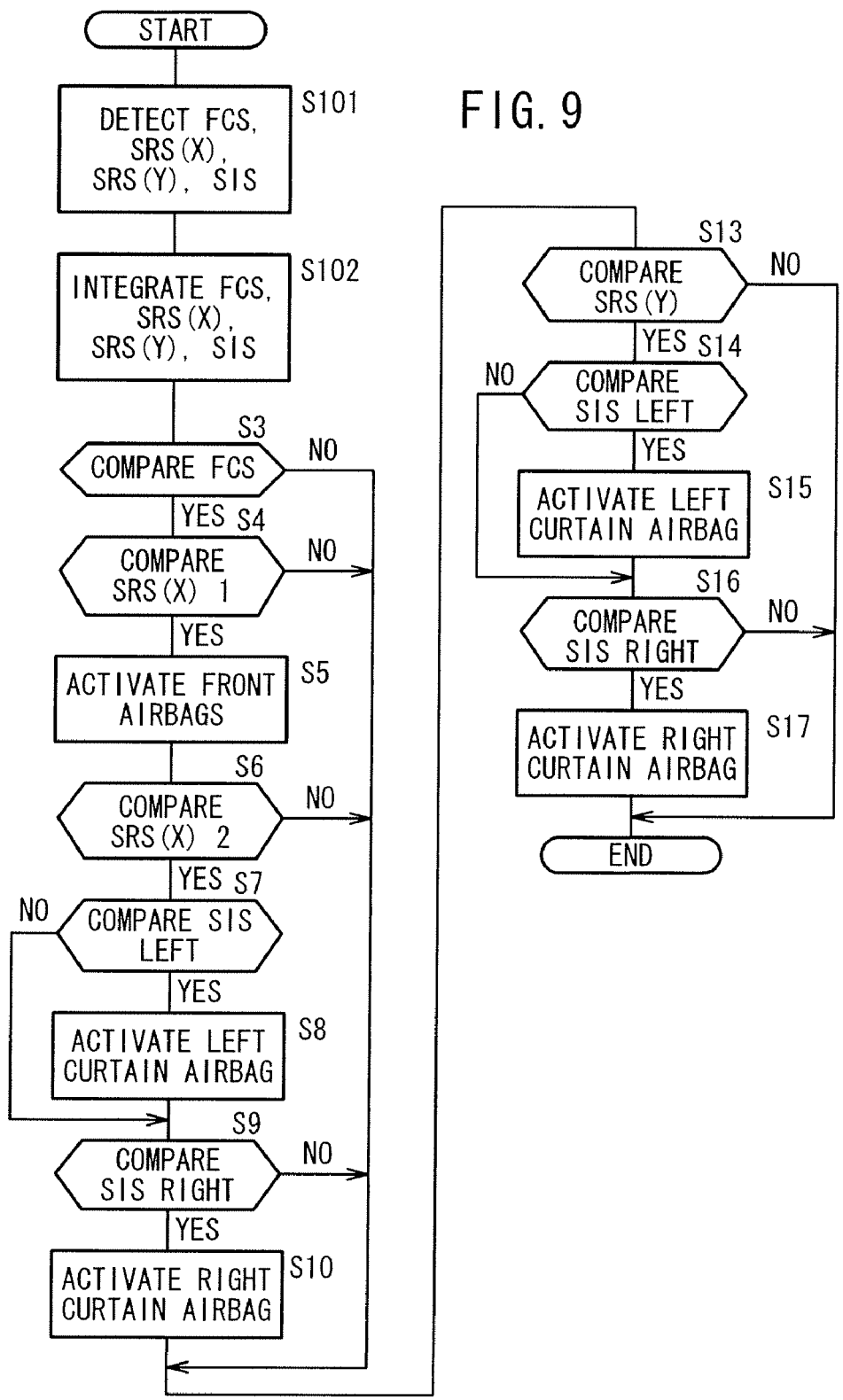
FIG. 9 is a flowchart of an operation sequence of the vehicle collision decision apparatus according to the third embodiment shown in FIGS. 7 and 8.

A vehicle collision decision apparatus according to a third embodiment of the present invention will be described in detail below with reference to FIGS. 7 through 9. FIGS. 7 and 8 show in block form the vehicle collision decision apparatus 10C according to the third embodiment of the present invention. Those parts of the vehicle collision decision apparatus 10C according to the third embodiment that are identical to those of the vehicle collision decision apparatus 10A, 10B according to the first and second embodiments are denoted by identical reference characters, and such features will not be described in detail below.

As shown in FIGS. 7 and 8, the vehicle collision decision apparatus 10C comprises first acceleration detectors (FCS) 12a, 12b, a second acceleration detector 14, third acceleration detectors (SIS) 16a through 16d, collision decision devices 20A, 20B, OR gates 26f, 26g, front airbags 30, and curtain airbags 32a, 32b.

The vehicle collision decision apparatus 10C differs from the vehicle collision decision apparatus 10A, 10B as follows: Acceleration of the vehicle 40 in the longitudinal direction, which is detected by the second acceleration detector 14, is output to the cumulative integrator 23a, whereas acceleration of the vehicle 40 in the transverse direction, which is detected by the second acceleration detector 14, is output to the interval integrator 22c. Acceleration of the vehicle 40 in the transverse direction, which is detected by the third acceleration detector 16a, is output to the cumulative integrator 23b and to the interval integrator 22d. Acceleration detected by the third acceleration detector 16b is output to the cumulative integrator 23c and to the interval integrator 22e. Acceleration detected by the third acceleration detector 16c is output to the cumulative integrator 23d and to the interval integrator 22f. Acceleration detected by the third acceleration detector 16d is output to the cumulative integrator 23e and to the interval integrator 22g.

The ANDed results from the AND gates 28d, 28f are output to the OR gate 26f, whereas the ANDed results from the AND gates 28e, 28g are output to the OR gate 26g. When the OR gate 26f outputs a true-value signal as an ORed result to the curtain airbag 32a, the curtain airbag 32a is activated. When the OR gate 26g outputs a true-value signal as an ORed result to the curtain airbag 32b, the curtain airbag 32b is activated.

Figure 4:
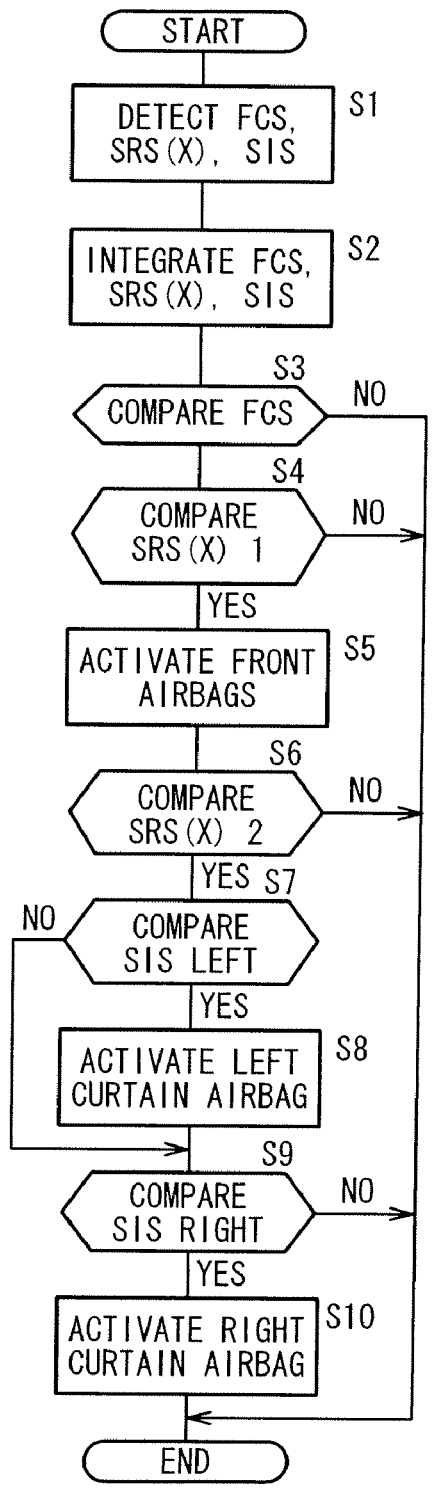
FIG. 4 is a flowchart of an operation sequence of the vehicle collision decision apparatus according to the first embodiment shown in FIG. 1.

The vehicle collision decision apparatus 10C according to the third embodiment basically is constructed as described above. Operations of the vehicle collision decision apparatus 10C will be described below with reference to the flowchart shown in FIG. 9. The flowchart shown in FIG. 9 resembles a combination of the flowcharts shown in FIGS. 4 and 6, except that steps S1, S2 shown in FIG. 4 and steps S11, S12 shown in FIG. 6 are replaced with steps S101, S102, and step S10 shown in FIG. 4 is followed by steps S13 through S17 shown in FIG. 6.

When the vehicle 40 incorporating the vehicle collision decision apparatus 10C is involved in a vehicle collision, the first acceleration detectors 12a, 12b, the second acceleration detector 14, and the third acceleration detectors 16a through 16d detect a deceleration of the vehicle 40, which is caused by the vehicle collision, as respective accelerations in step S101. The accelerations are output to the interval integrators 22a through 22g, and to the cumulative integrators 23a through 23e, which integrate the supplied accelerations in step 102.

Specifically, the acceleration detected by the first acceleration detector 12a is integrated by the interval integrator 22a, which outputs the interval integral $\Delta$VXFL to the comparator 24a. The acceleration detected by the first acceleration detector 12b is integrated by the interval integrator 22b, which outputs the interval integral $\Delta$VXFR to the comparator 24b. The acceleration detected by the second acceleration detector 14 is integrated by the cumulative integrator 23a, which outputs the cumulative integral $\Delta$VXE to the comparators 24c, 24cx. The acceleration detected by the third acceleration detector 16a is integrated by the cumulative integrator 23b, which outputs the cumulative integral $\Delta$VYSL1 to the comparator 24d. The acceleration detected by the third acceleration detector 16b is integrated by the cumulative integrator 23c, which outputs the cumulative integral $\Delta$VYSL2 to the comparator 24e. The acceleration detected by the third acceleration detector 16c is integrated by the cumulative integrator 23d, which outputs the cumulative integral $\Delta$VYSR1 to the comparator 24f. The acceleration detected by the third acceleration detector 16d is integrated by the cumulative integrator 23e, which outputs the cumulative integral $\Delta$VYSR2 to the comparator 24g. The acceleration detected by the second acceleration detector 14 is integrated by the interval integrator 22c, which outputs the interval integral $\Delta$VYE to the comparator 24h. The acceleration detected by the third acceleration detector 16a is integrated by the interval integrator 22d, which outputs the interval integral $\Delta$VYSL1S to the comparator 24i. The acceleration detected by the third acceleration detector 16b is integrated by the interval integrator 22e, which outputs the interval integral $\Delta$VYSL2S to the comparator 24j. The acceleration detected by the third acceleration detector 16c is integrated by the interval integrator 22f, which outputs the interval integral $\Delta$VYSR1S to the comparator 24k. The acceleration detected by the third acceleration detector 16d is integrated by the interval integrator 22g, which outputs the interval integral $\Delta$VYSR2S to the comparator 24l.

If at least one of the interval integrals $\Delta$VXFL, $\Delta$VXFR is greater than the threshold value XFTH in the comparators 24a, 24b, then the processing sequence from step S3 to step S10, as described above according to the first embodiment, is carried out.

If either one of the interval integrals $\Delta$VXFL, $\Delta$VXFR is smaller than the threshold value XFTH in the comparators 24a, 24b, then the processing sequence from step S13 to step S17, as described above according to the second embodiment, is carried out.

In steps S8 and S15, for activating the curtain air bag 32a, if the interval integrals or the cumulative integrals of the accelerations detected by the first acceleration detectors 12a, 12b, the second acceleration detector 14, and the third acceleration detectors 16a through 16d are greater than the respective threshold values, the AND gate 28d outputs a true-value signal to the OR gate 26f. Similarly, if the interval integrals or the cumulative integrals of the accelerations detected by the second acceleration detector 14 and the third acceleration detectors 16a, 16b are greater than the respective threshold values, the AND gate 28f outputs a true-value signal to the OR gate 26f. When at least one of the true-value signals is supplied to the OR gate 26f, the OR gate 26f outputs a true-value signal to the curtain airbag 32a, which in turn is activated thereby.

Similarly, in steps S10 and S17, for activating the curtain air bag 32b, if the interval integrals or the cumulative integrals of the accelerations detected by the first acceleration detectors 12a, 12b, the second acceleration detector 14, and the third acceleration detectors 16a through 16d are greater than the respective threshold values, the AND gate 28e outputs a true-value signal to the OR gate 26g. Similarly, if the interval integrals or the cumulative integrals of the accelerations detected by the second acceleration detector 14 and the third acceleration detectors 16a through 16d are greater than the respective threshold values, the AND gate 28g outputs a true-value signal to the OR gate 26g. When at least one of the true-value signals is supplied to the OR gate 26g, the OR gate 26g outputs a true-value signal to the curtain airbag 32b, which in turn is activated thereby.

With the vehicle collision decision apparatus 10C according to the third embodiment, as described above, the first acceleration detectors 12a, 12b and the second acceleration detector 14 detect an acceleration of the vehicle 40 in a longitudinal direction thereof, whereas the third acceleration detectors 16a through 16d detect an acceleration of the vehicle 40 in a transverse direction thereof. When the vehicle 40 is involved in an offset collision, the front airbags 30 are activated based on the detected results from the first acceleration detectors 12a, 12b and the second acceleration detector 14. Thereafter, the curtain airbags 32a, 32b are reliably activated.

The second acceleration detector 14 and the third acceleration detectors 16a through 16d detect an acceleration of the vehicle 40 in a transverse direction thereof. When the vehicle 40 hits an object in an offset collision, and the hitting vehicle 40 is retracted from the object in a direction oblique to the direction in which the hitting vehicle 40 has traveled prior to the collision, the curtain airbags 32a, 32b are reliably activated if the angle of the retracted direction to the traveled direction is equal to or greater than a predetermined angle.

Furthermore, the curtain airbags 32a, 32b are prevented from being activated in error when the doors 46a through 46d are opened and closed. If the angle of the retracted direction to the traveled direction is smaller than the predetermined angle that occurs during an offset collision, then the curtain airbags 32a, 32b are activated based on the acceleration of the vehicle 40 in the longitudinal direction thereof, which is detected by the first acceleration detectors 12a, 12b and the second acceleration detector 14. If the angle of the retracted direction to the traveled direction is equal to or greater than the predetermined angle that occurs during an offset collision, then the curtain airbags 32a, 32b are activated based on the acceleration of the vehicle 40 in the transverse direction thereof, which is detected by the second acceleration detector 14 and the third acceleration detectors 16a through 16d. As a result, the curtain airbags 32a, 32b are reliably activated, irrespective of the angle of the retracted direction to the traveled direction of the vehicle 40 that occurs during an offset collision.

Although certain preferred embodiments of the present invention have been shown and described in detail, it should be understood that various changes and modifications may be made to the embodiments without departing from the scope of the invention as set forth in the appended claims.

What is claimed is:

1. A vehicle collision decision apparatus comprising:
    a vehicle occupant protection device for protecting an occupant of a vehicle;
    a first acceleration detector disposed in a front end of the vehicle for detecting an acceleration of the vehicle in a longitudinal direction thereof;
    a second acceleration detector disposed in a transversely central region of the vehicle near a front portion thereof for detecting an acceleration of the vehicle;
    a third acceleration detector disposed on a side of a seat disposed in the vehicle for detecting an acceleration of the vehicle in a transverse direction thereof;
    a first comparator for comparing a value based on the acceleration detected by the first acceleration detector with a first threshold value, and outputting a first comparison signal if the value based on the acceleration detected by the first acceleration detector is greater than the first threshold value;
    a second comparator for comparing a value based on the acceleration in the longitudinal direction of the vehicle detected by the second acceleration detector with a second threshold value, and outputting a second comparison signal if the value based on the acceleration detected by the second acceleration detector is greater than the second threshold value;
    a third comparator for comparing a value based on the acceleration detected by the third acceleration detector with a third threshold value, and outputting a third comparison signal if the value based on the acceleration detected by the third acceleration detector is greater than the third threshold value, and
    a sixth comparator for comparing the value based on the acceleration in the longitudinal direction of the vehicle detected by the second acceleration detector with a sixth threshold value, and outputting a sixth comparison signal if the value based on the acceleration detected by the second acceleration detector is greater than the sixth threshold value,
    wherein the vehicle occupant protection device is activated when the first, second, and third comparators output the first comparison signal, the second comparison signal, and the third comparison signal,
    wherein the sixth threshold value is smaller than the second threshold value, and the vehicle occupant protection device is activated after a front airbag in the vehicle has been activated based on the first comparison signal and the sixth comparison signal.

2. A vehicle collision decision apparatus according to claim 1, wherein the first comparator compares an interval integral obtained by performing an interval integration on the acceleration detected by the first acceleration detector with the first threshold value, and outputs the first comparison signal if the interval integral obtained by performing an interval integration on the acceleration detected by the first acceleration detector is greater than the first threshold value;
    the second comparator compares a cumulative integral obtained by performing a cumulative integration on the acceleration in the longitudinal direction of the vehicle detected by the second acceleration detector with the second threshold value, and outputs the second comparison signal if the cumulative integral obtained by performing a cumulative integration on the acceleration in the longitudinal direction of the vehicle is greater than the second threshold value; and
    the third comparator compares a cumulative integral obtained by performing a cumulative integration on the acceleration detected by the third acceleration detector with the third threshold value, and outputs the third comparison signal if the cumulative integral obtained by performing a cumulative integration on the acceleration detected by the third acceleration detector is greater than the third threshold value.

3. A vehicle collision decision apparatus according to claim 2, wherein the first threshold value is smaller than the second threshold value.

4. A vehicle collision decision apparatus according to claim 1, wherein the sixth comparator compares a cumulative integral obtained by performing a cumulative integration on the acceleration in the longitudinal direction of the vehicle detected by the second acceleration detector with the sixth threshold value, and outputs the sixth comparison signal if the cumulative integral obtained by performing a cumulative integration on the acceleration in the longitudinal direction of the vehicle is greater than the sixth threshold value.

5. A vehicle collision decision apparatus according to claim 4, wherein the first threshold value is smaller than the second threshold value.

6. A vehicle collision decision apparatus according to claim 1, wherein the vehicle occupant protection device comprises a curtain airbag.

7. A vehicle collision decision apparatus comprising:
a vehicle occupant protection device comprising a first vehicle occupant protection device for protecting an occupant of a vehicle;
a first acceleration detector disposed in a front end of the vehicle for detecting an acceleration of the vehicle in a longitudinal direction thereof;
a second acceleration detector disposed in a transversely central region of the vehicle near a front portion thereof for detecting an acceleration of the vehicle;
a third acceleration detector disposed on a side of a seat disposed in the vehicle for detecting an acceleration of the vehicle in a transverse direction thereof;
a first comparator for comparing a value based on the acceleration detected by the first acceleration detector with a first threshold value, and outputting a first comparison signal if the value based on the acceleration detected by the first acceleration detector is greater than the first threshold value;
a second comparator for comparing a value based on the acceleration in the longitudinal direction of the vehicle detected by the second acceleration detector with a second threshold value, and outputting a second comparison signal if the value based on the acceleration detected by the second acceleration detector is greater than the second threshold value;
a third comparator for comparing a value based on the acceleration detected by the third acceleration detector with a third threshold value, and outputting a third comparison signal if the value based on the acceleration detected by the third acceleration detector is greater than the third threshold value;
a fourth comparator for comparing a value based on the acceleration in the transverse direction of the vehicle detected by the second acceleration detector with a fourth threshold value, and outputting a fourth comparison signal if the value based on the acceleration detected by the second acceleration detector is greater than the fourth threshold value;
a fifth comparator for comparing a value based on the acceleration detected by the third acceleration detector with a fifth threshold value, and outputting a fifth comparison signal if the value based on the acceleration detected by the third acceleration detector is greater than the fifth threshold value; and
a sixth comparator for comparing the value based on the acceleration in the longitudinal direction of the vehicle detected by the second acceleration detector with a sixth threshold value, and outputting a sixth comparison signal if the value based on the acceleration detected by the second acceleration detector is greater than the sixth threshold value,
wherein the first vehicle occupant protection device is activated when the first, second, and third comparators output the first comparison signal, the second comparison signal, and the third comparison signal, or when the fourth and fifth comparators output the forth comparison signal and the fifth comparison signal, and wherein the sixth threshold value is smaller than the second threshold value, and the first vehicle occupant protection device is activated after a front airbag in the vehicle has been activated based on the first comparison signal and the sixth comparison signal.

8. A vehicle collision decision apparatus according to claim 7, wherein the first comparator compares an interval integral obtained by performing an interval integration on the acceleration detected by the first acceleration detector with the first threshold value, and outputs the first comparison signal if the interval integral obtained by performing an interval integration on the acceleration detected by the first acceleration detector is greater than the first threshold value;
the second comparator compares a cumulative integral obtained by performing a cumulative integration on the acceleration in the longitudinal direction of the vehicle detected by the second acceleration detector with the second threshold value, and outputs the second comparison signal if the cumulative integral obtained by performing a cumulative integration on the acceleration in the longitudinal direction of the vehicle is greater than the second threshold value;
the third comparator compares a cumulative integral obtained by performing a cumulative integration on the acceleration detected by the third acceleration detector with the third threshold value, and outputs the third comparison signal if the cumulative integral obtained by performing a cumulative integration on the acceleration detected by the third acceleration detector is greater than the third threshold value;
the fourth comparator compares an interval integral obtained by performing an interval integration on the acceleration in the transverse direction of the vehicle detected by the second acceleration detector with the fourth threshold value, and outputs the fourth comparison signal if the interval integral obtained by performing an interval integration on the acceleration detected by the second acceleration detector is greater than the fourth threshold value; and
the fifth comparator compares an interval integral obtained by performing an interval integration on the acceleration detected by the third acceleration detector with the fifth threshold value, and outputs the fifth comparison signal if the interval integral obtained by performing an interval integration on the acceleration detected by the third acceleration detector is greater than the fifth threshold value.

9. A vehicle collision decision apparatus according to claim 8, wherein the first threshold value is smaller than the second threshold value.

10. A vehicle collision decision apparatus according to claim 7, wherein the sixth comparator compares a cumulative integral obtained by performing a cumulative integration on the acceleration in the longitudinal direction of the vehicle detected by the second acceleration detector with the sixth threshold value, and outputs the sixth comparison signal if the cumulative integral obtained by performing a cumulative integration on the acceleration in the longitudinal direction of the vehicle is greater than the sixth threshold value.

11. A vehicle collision decision apparatus according to claim 10, wherein the first threshold value is smaller than the second threshold value.

12. A vehicle collision decision apparatus according to claim 7, wherein the first vehicle occupant protection device comprises a curtain airbag.

* * * * *

UNITED STATES PATENT AND TRADEMARK OFFICE
CERTIFICATE OF CORRECTION

PATENT NO. : 8,200,395 B2  
APPLICATION NO. : 12/252923  
DATED : June 12, 2012  
INVENTOR(S) : Masatoshi Hayasaka et al.

It is certified that error appears in the above-identified patent and that said Letters Patent is hereby corrected as shown below:

On the Title Page:

Item (73) Assignees: should read, KEIHIN CORPORATION and HONDA MOTOR CO., LTD.

Signed and Sealed this  
Thirty-first Day of July, 2012

David J. Kappos  
*Director of the United States Patent and Trademark Office*